United States Patent [19]

Ver Strate et al.

[11] 4,319,061

[45] Mar. 9, 1982

[54] LOW MOLECULAR WEIGHT TERMINALLY-FUNCTIONAL SATURATED HYDROCARBON POLYMER

[75] Inventors: Gary Ver Strate, Matawan, N.J.; Francis P. Baldwin, Coupeville, Wash.

[73] Assignee: Exxon Research and Engineering Co., Florham Park, N.J.

[21] Appl. No.: 222,320

[22] Filed: Jan. 5, 1981

Related U.S. Application Data

[60] Division of Ser. No. 849,539, Nov. 7, 1977, Pat. No. 4,278,822, which is a continuation of Ser. No. 642,294, Dec. 19, 1975, abandoned.

[51] Int. Cl.$^3$ .................. C07C 17/28; C07C 15/00
[52] U.S. Cl. ................................... 570/191; 570/257; 585/19; 585/24; 585/422; 585/446
[58] Field of Search .................. 570/191, 257; 585/19, 585/24

[56] References Cited

U.S. PATENT DOCUMENTS

| | | | |
|---|---|---|---|
| 2,533,053 | 12/1950 | Schmerling | 570/257 |
| 2,603,650 | 7/1952 | Schmerling | 570/257 |
| 3,002,033 | 9/1961 | Feighner | 570/257 |
| 3,268,603 | 8/1966 | Goble | 570/257 |
| 3,649,698 | 3/1972 | Schmerling | 570/257 |

*Primary Examiner*—Curtis R. Davis
*Attorney, Agent, or Firm*—Henry E. Naylor; Harvey L. Cohen

[57] ABSTRACT

Terminally-functional saturated hydrocarbon low molecular weight liquid polymers are prepared by cationic polymerization of a 1-alkene containing at least one tertiary or phenyl substituted carbon in the presence of a transfer agent containing a benzylic or tertiary halogen and at least one primary or secondary halogen wherein the 1-alkene is capable of being polymerized by a Friedel Crafts catalyst.

11 Claims, No Drawings

LOW MOLECULAR WEIGHT TERMINALLY-FUNCTIONAL SATURATED HYDROCARBON POLYMER

This is a division of application Ser. No. 849,539, filed Nov. 7, 1977, now U.S. Pat. No. 4,278,822, which is a continuation of application Ser. No. 642,294, filed Dec. 19, 1975, now abandoned.

BACKGROUND OF THE INVENTION

This invention relates to a low molecular weight liquid polymer having a saturated hydrocarbon backbone and terminal functionality.

Presently there are a great many commercially produced polymers available having a wide variety of properties dependent on variations in chemical structure. One type of polymer not presently available but very often desired is a low molecular weight liquid polymer having a saturated hydrocarbon backbone and terminal functionality. Such low molecular weight polymers would permit automated production with low power equipment as well as providing efficient crosslinking and chain building in view of their terminal functionality. Low molecular weight polymers without terminal functionality do not crosslink efficiently. The polymers of the instant invention are obtained by polymerizing a 1-alkene, containing at least one tertiary or phenyl substituted carbon in the presence of a transfer agent containing a benzylic or tertiary halogen and at least one other halogen which can be either a primary or secondary halogen.

The use of chain transfer is taught in U.S. Pat. No. 3,565,878 where a hindered unpolymerizable olefin replaces a labile halogen on a polymer backbone when the halopolymer and olefin are contacted in the presence of an organoaluminum compound. Also, U.S. Pat. No. 3,299,020 teaches the preparation of a relatively high molecular weight copolymer of isobutylene or isoprene with methallyl chloride using a Friedel-Crafts catalyst. None of the techniques previously known in the art are capable of producing a low molecular weight polymer having a saturated backbone as well as terminal functionality.

SUMMARY OF THE INVENTION

It has surprisingly been found that liquid polymers having an $\overline{M}_n$ of about 500 to 5,000 as measured by vapor phase osmometry and having a saturated backbone and terminal functionality and capable of being efficiently crosslinked can now be prepared. Such liquid elastomers, also known as elastomeric telomers, can be prepared by polymerizing a 1-alkene, such as 4-methylpentene-1 in the presence of a transfer agent such as 1,3 dibromo-3 methyl butane. It is critical to the present invention that the 1-alkene contain at least one tertiary or phenyl substituted carbon and be capable of being polymerized by a Friedel-Crafts catalyst. It is preferable that the 1-alkene not be substituted at the 2 position. Also critical to the present invention, when the same functionality is required, is the transfer agent, which must contain a benzylic or tertiary halogen and at least one primary or secondary halogen.

The polymers of the instant invention are also useful as intermediates in the preparation of dispersants and surfactants.

DETAILED DESCRIPTION 1-alkenes suitable for use in the instant invention are those having at least one tertiary or phenyl substituted carbon and which are capable of being polymerized by a Friedel-Crafts catalyst. Preferred are 1-alkenes with one tertiary or phenyl substituted carbon. Such preferred 1-alkenes can be represented by the structural formula:

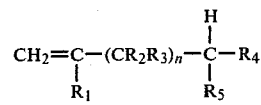

where $R_1$, $R_2$, $R_3$, $R_4$ and $R_5$ are independently alkyl, phenyl, alkylphenyl, halophenyl and hydrogen, n=0 to 10, and wherein it is preferred that said alkene contain no more than 1 trisubstituted carbon atom.

The preferred 1-alkenes are those in which $R_1$, $R_2$ and $R_3$ are H; $R_4$ and $R_5$ are methyl, ethyl, propyl; and n is 1. Most preferred is 4-methyl pentene-1.

Transfer agents suitable for use in the instant invention are those halogen containing compounds having at least four carbon atoms and containing a primary or secondary halogen as well as a tertiary, benzylic or allylic activated halogen. Representative examples of such transfer agents include, but are not limited to those represented by the following:

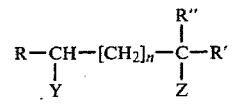

where Z is halogen, Y is halogen or hydrogen, R' and R'' are independently alkyl, phenyl, or allyl, R is alkyl, phenyl, allyl, or hydrogen, and n is 0 or 1; and when Y is hydrogen R cannot be allyl; or

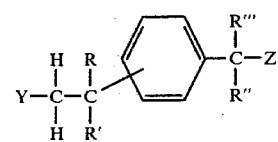

where Y and Z are halogen and R, R', R'', and R''' are independently hydrogen, alkyl, or phenyl; or

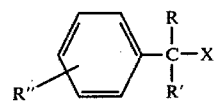

where X is halogen and R, R' and R'' are independently hydrogen, alkyl, or phenyl.

Preferred is 1,3-dibromo-3-methylbutane. It will also be noted that when a transfer agent as defined above is used in the instant invention, low molecular weight polymer is produced having identical terminal functionality on each end of the polymer when Y and Z are the same halogen group. Halogen will be mixed; that is, primary, secondary and tertiary.

There may also be instances when it is desirable to have either mixed or single terminal functionality on the polymers of the instant invention. When this is the case, it is understood that a transfer agent other than those described above must be used. In preparing a polymer with terminally mixed functionality it is necessary to use a transfer agent, similar to the above described transfer agents, except that said transfer agent contains only one halogen and another group selected from the group consisting of silyl, alkoxy, alkenyl etc., and an aromatic ring; preferred is an aromatic ring. Therefore, the preferred transfer agent for producing a low molecular weight polymer containing terminally mixed functionality is one having at least four carbons (other than those forming the aromatic ring) and containing a halogen and an aromatic ring. It is preferred that the halogen be in a tertiary position and the other group primary or secondary. When such a transfer agent is used in the instant invention, a low molecular weight polymer is produced with halogen at one end and an aromatic ring at the other. The aromatic ring can then be substituted to produce a surfactant or dispersant, etc.

When a polymer with terminal functionality only on one end of the molecule is desired, the transfer agent is preferably one having at least four carbons and a tertiary halogen attached thereto. The term halogen when used to define the transfer agent of the instant invention means bromine, chlorine, and iodine.

The term "terminal functionality" as used in the instant specification and claims describes the polymers of the instant invention containing functional groups attached to the terminal monomer unit or units. Mixed functionality as used in the instant invention describes those cases where one terminal monomer unit has attached thereto a functional group such as halogen and the other terminal monomer unit has attached thereto a functional group other than halogen. It will be noted that the transfer agent can also be a terminal unit on the chain.

Although not wishing to be limited by theory, it is proposed that the labile tertiary halogen of the transfer agent is transferred to a growing poly (1-alkene) chain, thus terminating that chain and leaving a tertiary carbonium ion which is substituted by an unreactive primary or secondary halogen depending on the specific transfer agent used. This tertiary carbonium ion initiates a new polymer chain. Chain transfer from another molecule of transfer agent to this growing chain gives a saturated chain with a halogen at both ends.

The polymers of the instant invention containing terminal halogen functionality may subsequently be directly crosslinked by use of multifunctional curing agents. They may also undergo conversion of halogen functionality by conventional means to a functionality such as hydroxyl; isocyanato, mercapto, amino, phosphato, carboxy, sulfonyl cyanato, isothiocyanato, epoxy, borane which can then be efficiently crosslinked.

The configuration and amount of functionality in the telomers of the instant invention can be evaluated with infrared and nuclear magnetic resonance measurements. The total halogen content can be measured by elemental analysis. Functionality is estimated by combining such analytical methods with number average molecular weight as measured by vapor pressure osmometry. After determining that two halogen atoms per polymer chain are present, demonstration that the halogen is near the end of the polymer chains requires coupling of the chains with concomitant change in molecular spatial configuration or properties which correspond to a linear extension of the molecule, or formation of an elastic network with properties incompatible with the formation of "star-shaped" clumps, i.e., with large numbers of loose ends.

Any conventional Friedel-Crafts catalyst which leads to cationic polymerization can be used in the instant invention; preferred are $AlX_3$, $AlRX_2$, $AlR_2X$, where R is alkyl and X is a halogen; preferred is $AlCl_3$, $AlBr_3$; most preferred is $AlCl_3$.

The polymers of the instant invention are prepared in solution in a continuous stirred reactor (CSTR) which is stirred at about 4,000 rpm and cooled to about $-60°$ to $-100°$ C. When an aliphatic hydrocarbon solvent is used, it must be free of tertiary carbons to avoid the participation of the solvent in transfer reactions; preferred are the $C_5$ and $C_6$ n-hydrocarbons. The Friedel-Crafts catalyst is dissolved in a polar solvent which is inert with regard to transfer reactions with the polymer, or undesirable exchange reactions with the transfer agent. Nonlimiting examples of said polar solvent include halogenated hydrocarbons such as chloromethane, dichloromethane, ethyl chloride, and vinyl chloride; preferred is chloromethane. A dilute hydrocarbon solution of the transfer agent is employed to avoid crystallization of said agent upon cooling prior to entrance into the reactor. Monomer and transfer agent are dried by use of BaO in batches or by nitrogen sparging, whereas the solvent is purified in columns (sieves, silica gel) as it is metered into the reactor. Upon completion of the reaction, the catalyst is deactivated with isopropanol. In general no inhibitor or other ingredients are added. The resulting telomer is worked up by methanol extraction of pentane solutions, steam stripping, or direct vacuum drying. It will be noted that residence time and temperature are adjusted to minimize transfer and termination reactions other than those with the intended agent. The particular monomer-catalyst pair will dictate the exact conditions.

The molar ratio of catalyst to monomer of the instant invention is from about 10:500 to about 0.1:500; preferred is about 1:500. The molar ratio of transfer agent to catalyst can vary from about 250:1 to about 2.5:1; preferred is about 25:1.

EXAMPLE 1

The following ingredients were fed into a 400 cc well stirred continuous flow reactor at $-80°$ C.

| | |
|---|---|
| 4-methylpentene-1 | 4 cc/min |
| $AlBr_3$ . 2 wt. % in $CH_2Cl_2$ | 4 cc/min |
| pentane | 12 cc/min |

The resulting polymer was recovered by solvent evaporation after alcohol quenching of the catalyst. The polymer was tested and found to have an intrinsic viscosity of about 3.0 dl/g in diisobutylene at 20° C.; an $\overline{M}_n$ of about $4 \times 10^5$ gms/mole as measured by membrane osmometry; and a halogen content of less than 0.1 wt. %.

EXAMPLE 2

Two polymerization runs were performed as in Example 1 except bromoethane was added continuously to the reactor in amounts up to 25 times the molar amount of the catalyst in one run and in the other run 1-bromopropane was used. The polymerization was substantially unaffected and the product substantially the same as that of Example 1. That is, the product of this example showed no increase in the amount of halogen present. This example illustrates the inactivity of primary alkyl bromides in the instant polymerization system.

EXAMPLE 3

A polymerization was performed substantially the same as Examples 1 and 2 except 2-bromopropane was the added agent. The resulting polymer was substantially the same as those of Examples 1 and 2. This experiment illustrates the inactivity of secondary alkyl bromides in the instant polymerization system.

EXAMPLE 4

The following ingredients were fed into a 1300 cc well stirred continuous flow reactor at −80° C.

| | |
|---|---|
| 4 methylpentene-1 | 8.6 cc/min at 23° C. |
| AlCl₃ (0.1 wt. % in CH₂Cl₂) | 21 g/min at −60° C. |
| n-pentane | 40 cc/min at −60° C. |
| 1,3 dibromo-3-methylbutane (186 g/l solution in pentane) | 2.4 cc/min at 23° C. |
| | Total 1300 cc/20 min |

The above flow rates resulted in a residence time of 20 minutes and about 60–70% monomer conversion. The polymer solution emerging from the reactor was quenched in isopropanol; the solvent was evaporated and the yield determined. The polymer was subsequently redissolved in pentane and extracted three times with equal volumes of methyl alcohol. The polymer was then dried under vacuum (10 mm) and nitrogen. Table I contains physical data on the resulting polymer.

TABLE I

| | |
|---|---|
| $\overline{M}_n$ (VPO in benzene) | 3800 ± 15% g/mole |
| wt. % Br | 5.0 ± 2% |
| wt. % Cl | <0.1% |
| Number of Br atoms/molecule | 2.0 ± 15% by GPC |
| | 2.4 ± 15% by VPO |
| Intrinsic viscosity[1] | 0.09 dl/g |

[1] In 2,4,4-trimethylpentene-2, 20° C. at 3mg/ml

EXAMPLE 5

This set of experiments was performed to show that the functionality of the polymer of Example 4 is at the end of the polymer chains.

The polymer of Example 4 was dehydrohalogenated by refluxing a 20% polymer solution in tetrahydrofuran with a quantity of potassium tertiary butoxide equal to 3 times the molar amount of bromine in the polymer. Said refluxing was performed at 75° C. for 24 hours. The refluxed product was collected wherein it was found that Br and Cl were present at less than 0.01 wt. %. Infrared spectroscopy showed olefin absorption at 910, 990, 970 and 830 cm⁻¹ indicating the presence of the following structures:

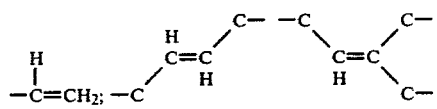

Upon dissolution of the refluxed polymer in chloroform and ozonization with subsequent reduction with LiAlH₄, the olefin absorption in the infrared were replaced with hydroxyl absorption at 1050–1200 cm⁻¹, 3600 cm⁻¹ and about 3300 cm⁻¹. The viscosity of a dilute solution of this material is substantially unchanged from that of the halogenated polymer of Example 4.

EXAMPLE 6

The following experiment was performed to again show that the functionality is at the opposite ends of the polymer chain.

The polymer of Example 5 containing the hydroxyl groups was reacted with a difunctional isocyanate, 2,4-diisocyanato toluene, at 80° C. The intrinsic viscosity of the polymer increased as a function of the isocyanate content. At a molar isocyanate content near that corresponding to the molar halogen content of the original polymer of Example 4, the intrinsic viscosity of the polymer increased fourfold. This increase in viscosity is interpreted as arising from end-to-end coupling of the chains. Assuming that the intrinsic viscosity is related to the molecular weight by $[\eta] = k\,Mv^{0.66}$ at 20° C. in 2,4,4-trimethylpentene-2. It is concluded that the polymer is about 90% capped with —OH groups at the ends, which groups have reacted with the isocyanate.

EXAMPLE 7

A polymer was prepared according to the method of Example 4 except 2-bromo-2-methylpropane was used as the transfer agent in place of 1,3-dibromo-3-methylbutane in the same molar amount as set forth in Example 4. The resulting polymer had all the characteristics of the polymer of Example 4 except there was only one halogen per chain, the primary halogen was absent.

EXAMPLE 8

A polymer was prepared according to the method of Example 4 except 1-phenyl-3-bromo-3-methylbutane was used in equimolar amounts instead of 1,3-dibromo-3-methylbutane as used in Example 4. The resulting polymer was similar to that of Example 4 except that the primary halogen was replaced by a benzene ring.

EXAMPLE 9

The dehydrohalogenated product of Example 5 was epoxidized with m-chloroperoxybenzoic acid in CHCl₃ at 23° C. The epoxide is reduced by LiAlH₄ and reacted with a triisocyanate (triphenyl methane triisocyanate in CH₂Cl₂) over a range of isocyanate levels. At molar isocyanate group levels somewhat above those corresponding to the molar amount of Br in the original polymer, 98% of the polymer crosslinked into an elastomeric network which was characterized by a wt. swelling ratio in cyclohexane of about 3.0 (weight polymer+solvent/weight solvent).

This experiment shows that rubbery networks can be formed with the polymers of the instant invention.

What is claimed is:
1. The polymeric reaction product of:
   (a) a 1-alkene, having at least one trisubstituted carbon atom, said alkene being selected from the group represented by the general formula:

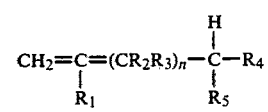

where $R_1$, $R_2$, $R_3$, $R_4$, and $R_5$ are independently hydrogen, alkyl, phenyl, alkyl phenyl or halophenyl and n is a number from 0 to 10 and (b) a transfer agent selected from those represented by the general formula

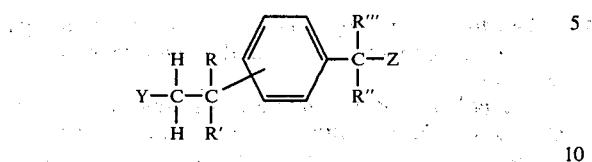

where Y and Z are halogen and R, R', R" and R''' are independently hydrogen, alkyl or phenyl and wherein said reaction product contains a saturated backbone, terminal functionality, and an $\overline{M}_n$ of about 500 to 5,000.

2. The product of the claim 1 wherein $R_3$ is hydrogen.

3. The product of claim 1 wherein $R_2$ and $R_3$ are hydrogen.

4. The product of claim 1 wherein $R_1$, $R_2$ and $R_3$ are hydrogen.

5. The reaction product of claim 1 wherein the 1-alkene is 4-methyl pentene-1.

6. The product of claim 1 wherein Y is hydrogen.

7. The product of claim 1 wherein the transfer agent is 1-[p-bromomethyl) phenyl] 2 bromoethane.

8. The product of claim 1 wherein the transfer agent is 1-ethyl-4-bromomethyl benzene.

9. The polymeric reaction product of:
(a) a 1-alkene having at least one trisubstituted carbon atom said alkene being selected from the group represented by the general formula:

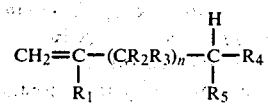

where $R_1$, $R_2$, $R_3$, $R_4$, and $R_5$ are independently hydrogen, alkyl, phenyl, allyl, phenyl or halophenyl and n is a number from 0 to 10; and (b) a transfer agent selected from the group represented by the formula:

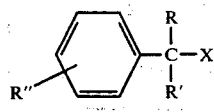

where X is halogen and R, R' and R" are independently hydrogen, alkyl, or phenyl.

10. The product of claim 9 wherein the 1-alkene is 4-methyl pentene-1.

11. The product of claim 9 wherein the 1-alkene contains only 1 trisubstituted carbon atom.

* * * * *